July 31, 1962 N. L. CARR 3,047,646
PROCESS FOR THE CATALYTIC HYDROISOMERIZATION
OF CRUDE NORMAL-PENTANE
Filed Dec. 7, 1959
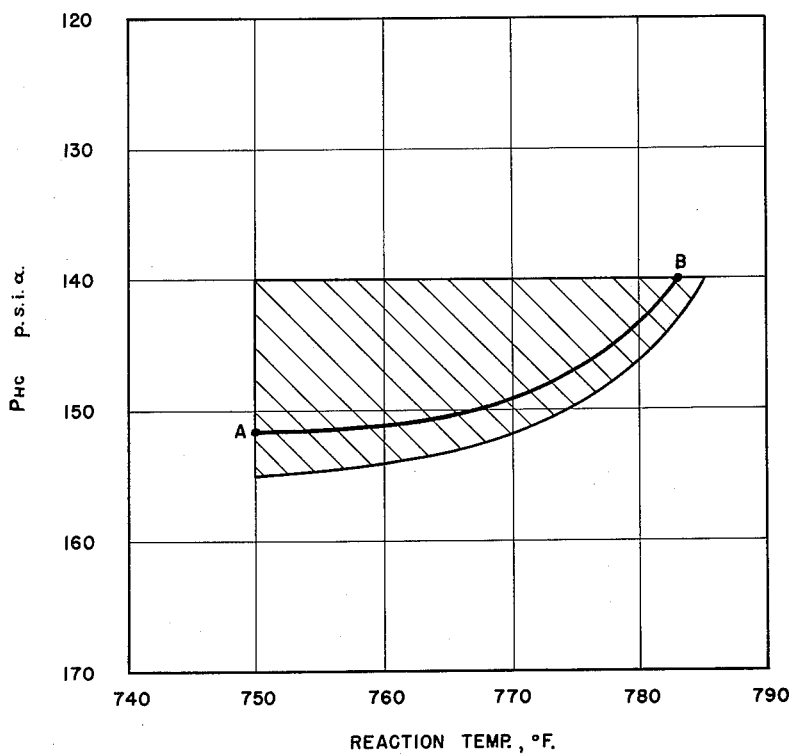
INVENTOR.
NORMAN L. CARR
BY *Edward H. Lang*
ATTORNEY 3,047,646
Patented July 31, 1962

3,047,646
PROCESS FOR THE CATALYTIC HYDROISOMERI-
ZATION OF CRUDE NORMAL-PENTANE
Norman L. Carr, Allison Park, Pa., assignor to The Pure
Oil Company, Chicago, Ill., a corporation of Ohio
Filed Dec. 7, 1959, Ser. No. 857,674
10 Claims. (Cl. 260—683.68)

This invention comprises a novel process for the catalytic hydroisomerization of a crude n-pentane cut containing a small amount of other closely related alkanes and naphthenes. In particular, the invention is concerned with an isomerization process which utilizes a fluorine-containing palladium on silica-alumina catalyst and process conditions which result in a maximum isomerization rate for n-pentane, while maintaining a substantially zero aging rate for the catalyst.

According to this invention, it has been found that the isomerization of a pentane feed stock containing up to about 10% vol. of hydrocarbon impurities consisting predominantly of hexanes and cyclopentane can be efficiently carried out at maximum reaction rate and substantially zero catalyst aging rate by processing the pentane feed and hydrogen in the presence of a catalyst consisting of 0.5–0.75% wt. palladium on small silica-alumina (containing 70–90% silica) pellets, and containing 1–5% combined fluorine, at a hydrogen partial pressure of 425–475 p.s.i.a. and a hydrocarbon partial pressure and reaction temperature which lie within the shaded area of the drawing.

Isomerization has recently come into prominence as a unit process in the petroleum industry for increasing the octane number of low-molecular-weight, liquid aliphatic hydrocarbons. In particular, the isomerization of n-pentane and n-hexane has been extensively investigated. The isopentanes and isohexanes are of considerable interest since they have substantially increased octane numbers over the corresponding normal paraffins. In the copending patent applications of Hillis O. Folkins et al., Serial No. 765,814, filed October 7, 1958; Serial No. 765,815, filed October 7, 1958, now Patent No. 2,943,129, and Serial No. 765,482, filed October 6, 1958, now Patent No. 2,948,128, there are described isomerization processes which utilize a solid refractory catalyst consisting of a small amount of palladium supported on an acidic silica-alumina hydrocarbon cracking catalyst containing a small amount of combined fluorine which has been added as hydrofluoric acid, ammonium fluoride, trifluoroacetic acid, aluminum fluoride, or zirconium fluoride. In those applications, the processes are described as being applicable to the isomerization of n-$C_4$–$C_7$ hydrocarbons at temperatures below 800° F. and being highly selective in the conversion of n-pentane and n-hexane to their respective isomers. Folkins et al. describe their isomerization processes in detail and set forth specific ranges of conditions of temperature, pressure, space velocity, and hydrogen/hydrocarbon mol ratio, which are desirable for optimum yields of the $C_4$–$C_7$ isomers. If the thermodynamic data for the formation of various hydrocarbon isomers are examined, it is seen that the formation of branched chain $C_4$–$C_7$ alkanes is favored at lower temperatures. Thus, theoretically, the maximum yield per pass for formation of branched chain isomers of the lower alkanes should be obtained at room temperature. It has been found, however, that the conversion of normal paraffins to isoparaffins requires moderately high temperature and a suitable catalyst if substantial yields of isoparaffins are to be obtained. The fluorine-containing palladium on silica-alumina catalysts are effective in the isomerization of n-pentane and n-hexane at temperatures of the order of 650–800° F. These catalysts, however, have a much greater tendency toward hydrocracking and the process conditions must be carefully chosen to obtain a high yield of isoparaffins without an appreciable amount of hydrocracking. It has thus become important to determine isomerization process conditions which may be used with a fluorine-containing palladium on silica-alumina catalysts which are conducive to high rate of isomerization without excessive promotion of undesired side reactions, such as hydrocracking and aromatization, and which at the same time result in a substantially zero aging rate for the catalyst. It has also been found that at elevated temperatures, and at certain conditions of hydrocarbon and/or hydrogen partial pressure, while there is a substantial increase in the rate of isomerization reaction, there is a substantial tendency toward coke fouling of the catalyst and a general decline in catalytic activity on extended use. It is therefore necessary to balance the requirement of high reaction rate against the disadvantages of a high ageing rate (rate of decline of activity) for the catalyst.

When a hydrocarbon cut is used which corresponds to a particular hydrocarbon fraction, such as n-pentane or n-hexane, the cut usually contains up to 10% vol. of other hydrocarbons as impurities, in particular naphthenic hydrocarbons and the adjacent paraffin hydrocarbons. Thus, a n-pentane cut used for the feed to an isomerization process would ordinarily contain up to about 10% vol. of hydrocarbon impurities consisting essentially of n-hexane and cyclo-pentane. The inclusion of these hydrocarbon impurities in the n-pentane feed introduces problems into the isomerization process for which there were previously no solutions. The inclusion of an appreciable amount of naphthenic hydrocarbons, such as cyclopentane, and cyclohexane in an isomerization feed usually results in a rapid coke fouling and high aging rate. The catalyst ageing rate is also affected by the catalyst pellet size and the palladium metal content.

I have previously shown in my paper "Kinetics of Catalytic Isomerization of n-Pentane" read before the Division of Petroleum Chemistry, American Chemical Society, April 1959 meeting, that for any specific combination of catalyst, reaction temperature, and feed stock composition, there is an optimum total pressure at which the maximum isomerization rate is obtained at each hydrogen/hydrocarbon ratio. However, many of the maximum isomerization reaction rates are accompanied by excessively high catalyst fouling rates, because, in general, both rates are increased by increasing the same reaction variables, viz., temperature, hydrocarbon partial pressure, molecular weight of the feed stock, and naphthene concentration in the feed stock. As a result, it has been impractical to operate an isomerization process using a fluorine-containing palladium on silica-alumina catalyst at temperatures above about 740° F. because of excessive aging of the catalyst and excessive tendency toward hydrocracking.

It is therefore one object of this invention to provide a new and improved process for the isomerization of an impure hydrocarbon feed which consists predominantly of n-pentane containing a small amount of other hydrocarbons as contaminants.

A further object of this invention is to isomerize a n-pentane feed, containing up to 10% vol. of hydrocarbon impurities consisting essentially of hexanes and cyclopentane, using a catalyst consisting of 0.5–0.75 wt. percent palladium on an acidic silica-alumina support, containing 1–5% combined fluorine, under conditions of temperature, and hydrogen/hydrocarbon ratio, which effect a maximum isomerization rate at a substantially zero aging rate for the catalyst.

Another object of this invention is to provide an improved catalytic isomerization process in which the decline of catalyst activity is effectively mitigated, while maintaining very high reaction rates.

A feature of this invention is the provision of an improved isomerization process using an isomerization catalyst consisting of 0.5–0.75% wt. palladium on an acidic silica-alumina (70–90% silica) support, containing 1–5% combined fluorine, in which the reaction temperature and partial pressures of hydrogen and pentane feed are carefully controlled to provide a maximum isomerization reaction rate and a substantially zero aging rate for the catalyst.

Another feature of this invention is the provision of an improved isomerization process in which a sulfur-free hydrocarbon feed consisting of n-pentane containing up to about 10% vol. of hydrocarbon impurities consisting essentially of hexanes and cyclopentane is isomerized by contact with an isomerization catalyst consisting of 0.5–0.75% wt. palladium supported on silica-alumina (containing 70–90% silica), containing 1–5% combined fluorine, at a hydrogen pressure of 425–475 p.s.i.a., hydrocarbon pressure of about 140–155 p.s.i.a., and a reaction temperature of about 750°–785° F., all lying within the shaded area of the drawing.

Still another feature of this invention is the provision of an improved isomerization process using a fluorine-containing, palladium on silica-alumina catalyst in which catalyst pellets are used of a size and metal content which are highly resistant to aging and have a high activity for formation of isoparaffins.

Other objects and features of this invention will become apparent from time to time throughout the specification and claims as hereinafter related.

In the accompanying drawing, to be taken as part of the specification, there is presented a graph showing the range of isomerization reaction temperature, and partial pressure of the crude n-pentane feed at a hydrogen partial pressure of 425–475 p.s.i.a, which results in a maximum isomerization reaction rate (K=17–22) and a substantially zero aging rate for the catalyst (0.5–0.75% wt. palladium on an acidic silica-alumina support containing 1–5% combined fluorine).

This invention consists essentially of a process for the isomerization of an impure n-pentane feed containing up to about 10% vol. of hydrocarbon impurities, such as hexanes and cyclopentane. The n-pentane feed treated in this process is first subjected to a desulfurization process, such as catalytic hydrodesulfurization, optionally including caustic- and water-washing and drying of the effluent, or stabilization, to reduce the sulfur content to the range of about 5–50 p.p.m. This hydrocarbon feed is heated to an elevated temperature, preferably to about 400°–800° F. (although higher temperatures may be used), and passed through a desulfurization reactor or "guard-case" containing a suitable desulfurizing reactant to fix and remove sulfur without the release of hydrogen sulfide. Desulfurizing catalysts, which are well known in the prior art for removing sulfur (as hydrogen sulfide) from hydrocarbons, include various metals, such as copper, nickel, iron, molybdenum, and cobalt, and their oxides and various compounds thereof, such as copper molybdate, cobalt molybdate, nickel molybdate, etc., preferably supported on a silica, silica-alumina, or alumina support. Such materials are also effective as reactants in a "guard-case" to fix and remove sulfur without the release of hydrogen sulfide. The desulfurization catalyst may be the same as the catalyst used in the isomerization reaction. Additional details of this desulfurization process and the need for using a totally desulfurized feed are discussed in my copending application Serial No. 731,778, filed April 29, 1958. This chemical treatment usually reduces the sulfur content of the feed to less than about 1 p.p.m. and may produce a sulfur content of practically zero. The completely desulfurized pentane feed is then passed to the isomerization reactor (with the 0.5–0.75 palladium on silica-alumina catalyst), with free hydrogen at a partial pressure of 425–475 p.s.i.a., and at a reaction temperature in the range of about 750°–785° F. (preferably 750°–760° F.), and pentane feed partial pressure in the range of about 140–155 p.s.i.a., all lying within the shaded area of the drawing. Under these reaction conditions, the n-pentane is converted to isopentane in a very high yield, approaching equilibrium, and at an extremely high reaction rate (rate constant K=17–22) and at a catalyst aging rate of substantially zero. Aging, as it is used herein, means a change in catalyst activity with processing time under the test conditions used, and includes all possible "poisoning" action from coke, trace sulfur, and other forms of activity changes, which might be dependent upon the basic catalysts or system. The process conditions for maximum isomerization reaction rate, accompanied by a substantially zero catalyst aging rate for an impure n-pentane feed, as previously described, using a catalyst consisting of 0.5–0.75% wt. palladium on silica-alumina (containing 70–90% wt. silica), containing 1–5% combined fluorine, lie substantially along the curved line A—B (or curved surface since the line extends along the "Z" axis in the range from 425–475 p.s.i.a. hydrogen partial pressure) in the attached drawing. Along the line (or surface) A—B the isomerization rate constant is at a maximum value (in the range from 17–22) and the catalyst aging rate is substantially zero. A substantial increase in hydrogen partial pressure above 475 p.s.i.a. has been found to increase the aging rate and decrease the isomerization rate, while a substantial decrease in hydrogen partial pressure below 425 p.s.i.a. increases the aging rate, but also increases the isomerization rate. A decrease in hydrocarbon partial pressure below about 140 p.s.i.a. decreases the isomerization rate substantially without significantly affecting the aging rate, while an increase in hydrocarbon partial pressure above the limits defined by the line (or surface) A—B increases both isomerization rate and catalyst aging rate. A decrease in the reaction temperature below 750° F. decreases the isomerization rate very rapidly without affecting the catalyst aging rate substantially, while increasing the temperature above 760° F. does not increase the isomerization reaction rate further. Increase in temperature beyond the line A—B increases the catalyst aging rate.

The catalysts containing 0.5–0.75% wt. palladium on silica-alumina (70–90% silica), containing 1–5% combined fluorine, are more active then catalysts containing less palladium and are more resistant to aging. Catalysts containing a higher proportion of palladium are not appreciably more active and are actually less selective for formation of the desired isoparaffins. Catalysts which are formed or broken into 1/16" pellets are much more resistant to aging than 1/4" or 1/8" catalyst pellets. Smaller catalyst pellets are impractical as they tend to be entrained by the feed at high flow rates and also increase the resistance of the reatcor by a substantial amount.

The following non-limiting examples are illustrative of the scope of this invention.

EXAMPLE I

A 0.65% wt. palladium on 75/25 silica-alumina catalyst (1/16" pellets) was prepared by impregnating a 75/25 silica-alumina hydrocarbon cracking catalyst with a solution of palladium chloride containing hydrofluoric acid in concentration sufficient to produce the desired palladium content in the catalyst and a combined fluorine content of about 2%. The impregnated catalyst thus produced was dried and reduced with hydrogen at a temperature of 750–975° F. to produce a highly active catalyst of the desired composition. The procedure for the preparation of the catalyst is described in considerable detail in the aforementioned copending applications of Hillis O. Folkins et al. Alternatively, the combined fluorine in the catalyst may be added in the form of ammonium fluoride, trifluoroacetic acid, or precipitated aluminum fluoride, or zirconium fluoride, as described in the applications of Hillis O. Folkins et al. The catalyst, which was thus prepared, consisting of 0.65% palladium on 75/25 silica-alumina, containing 2% combined fluorine, was extruded and cut into ⅛-inch diameter pellets, which were broken in half to form catalyst pellets ⅟₁₆ inch in thickness. The catalyst which was thus prepared was used in carrying out a number of experimental tests for catalyst aging under different reaction conditions. In each case, the hydrocarbon feed consisted of approximately 88% vol. n-pentane, 2% vol. isopentane, 5% vol. cyclopentane, and 5% vol. n-hexane. The cyclopentane concentration used was slightly higher than would be encountered in a n-pentane feed, but represented the normal level which would be encountered in an isomerization reactor as a result of cyclopentane build-up produced by recycling. The hydrocarbon feed was desulfurized to a sulfur content less than about 1 p.p.m., as described in my copending patent application, using a "guard-case" containing a desulfurization reactant consisting of 15% reduced nickel moylbdate on 75/25 silica-alumina. The desulfurized, impure n-pentane feed was circulated over the catalyst in an isomerization reactor for extended periods of time, up to about 100 hours, at different reaction conditions of temperature, hydrogen/hydrocarbon ratio, and reaction temperature. In each experiment, the yield of isopentane was noted initially and after an extended period of time to determine the aging rate of the catalyst, which is expressed in decrease of yield percent per 100 hours of process operation. The reaction rate constant for the isomerization process under the conditions used was calculated according to the equation:

$$K = (LWHSV) \ln\left[\frac{1}{1-\frac{X}{62}}\right]$$

where LWHSV is the liquid weight hourly space velocity and X is the percent isopentane yield. The rate constant K provides the basis of comparison for catalyst activity under different conditions of temperature, space velocity, etc.

A mixture of hydrogen and n-pentane (containing 10% vol. $C_5$ and $C_6$ impurities) was passed over a 0.65% wt. palladium on 75/25 silica-alumina, containing 2% combined fluorine, catalyst at a temperature of 783° F. and liquid weight hourly space velocity of 10.1 for a period of 98 hours. The hydrogen partial pressure was 435 p.s.i.a. and the hydrocarbon feed partial pressure was 140 p.s.i.a. The initial yield of isopentane was 51.4% which remained constant for the entire 98-hour run. The reaction rate constant for the process under these reaction conditions is 18.0, while the aging rate for the catalyst is zero.

A number of additional runs of this same type were carried out in which the temperature and partial pressures of hydrogen and the pentane feed were varied, and determinations were made of the rate constant K and aging rate of the catalyst under the isomerization conditions used. These data were obtained in a planned experimental program based on the so-called "steepest ascent" technique, which enabled me to determine the conditions at which maximum isomerization rate is obtained together with a substantially zero ($-\Delta Y/100$ hours is less than 1.0) aging rate. In Table I, there are set forth in tabular form the rate constants and aging rates which are obtained at different hydrogen and pentane feed partial pressures and isomerization reaction temperatures using the previously described impure n-pentane feed and the 0.65% wt. palladium on 75/25 silica-alumina, containing 2% combined fluorine, catalyst.

These data are analyzed mathematically according to the "steepest ascent" technique and are expressed graphically in the drawing, which shows the shaded area of temperature and hydrocarbon feed partial pressure as being the area of maximum isomerization reaction rate and substantially zero catalyst aging rate. This shaded area (which should actually be considered a volume, since it extends along the "Z" axis in the range from 425–475 p.s.i.a., hydrogen partial pressure) represents the region in which the isomerization rate constant lies in the range from about 17–22, and the catalyst aging rate is substantially zero. In Table I, from which the drawing is derived, the reaction rate constant "K" is shown on the left of each column, and the aging rate is set forth in parenthesis, expressed as decline in yield percent for 100 hours of process operation.

EXAMPLE II

When an isomerization catalyst is prepared consisting of 0.65% wt. palladium on 87/13 silica-alumina, containing 2% combined fluorine, and used in the isomerization of an impure n-pentane feed stock, as above described, the maximum rate constant for the reaction is substantially the same as is obtained with a catalyst having a 75/25 silica-alumina support. This is a marked contrast to similar catalysts which contain no fluorine and which differ substantially is activity occording to the support composition. When this catalyst is used in the isomerization of the impure n-pentane feed under different conditions of reaction temperature, and partial pressures of hydrogen and pentane feed, it is found that reaction rate is at a maximum and the aging rate is subsantially zero when the process conditions are maintained within the range specified in the shaded area of the drawing. In Table II, there are set forth the rate constants and aging rates for the 0.65% wt. palladium on 87/13 silica-alumina catalyst for temperatures and pressures within and without the desired range which show that a maximum reaction rate and substantially zero aging rate are obtained within the shaded area of the drawing.

*Table I*

0.65 PALLADIUM +2% HF ON 75/25 RATE CONSTANT K AND AGING RATE ($-\Delta Y/100$ HRS.)

| Temp, °/F | | 730 | 750 | 765 | 775 | 780 | 785 |
|---|---|---|---|---|---|---|---|
| Pressure, p.s.i.a. | | | | | | | |
| Hydrogen | Hydrocarbon | | | | | | |
| 425 | 140 | 8.5(0) | -------- | -------- | 18.0(0) | -------- | 18.0(0) |
| 425 | 150 | -------- | -------- | 17.0(0) | 18.2(2.0) | -------- | -------- |
| 475 | 150 | -------- | 11.0(0) | -------- | 17.0(2.0) | -------- | -------- |
| 475 | 145 | -------- | -------- | 17.5(0) | -------- | 18.0(1.0) | -------- |
| 500 | 145 | 7.0(3.0) | -------- | 16.0(5.0) | -------- | -------- | -------- |
| 650 | 150 | 6.0(5.0) | -------- | 15.0(7.0) | -------- | -------- | -------- |
| 425 | 175 | -------- | -------- | -------- | 18.0(10) | -------- | -------- |
| 390 | 185 | -------- | -------- | 17.7(4) | -------- | -------- | -------- |
| 250 | 250 | 10(100) | -------- | -------- | -------- | -------- | -------- |

Table II 0.65 PALLADIUM +2% HF ON 87/13 RATE CONSTANT K AND AGING RATE (−ΔY/100 HRS.)

| Pressure, p.s.i.a. | | Temp, °F 730 | 750 | 765 | 775 | 780 | 785 |
|---|---|---|---|---|---|---|---|
| Hydrogen | Hydrocarbon | | | | | | |
| 425 | 140 | 8.5(0) | ------ | ------ | 18.0(0) | ------ | 18.0(0) |
| 475 | 150 | ------ | 11.0(0) | ------ | 17.0(2.0) | ------ | ------ |
| 475 | 145 | ------ | ------ | 17.5(0) | ------ | 18.0(1.0) | ------ |
| 650 | 150 | 6.0(5.0) | ------ | 15.0(7.0) | ------ | ------ | ------ |
| 425 | 175 | ------ | ------ | ------ | ------ | 18.0(10) | ------ |
| 250 | 250 | 10(100) | ------ | ------ | ------ | ------ | ------ |

The data in Table II also show that outside the range conditions indicated by the shaded area of the drawings, there is either excessive aging of the catalyst or uneconomically low reaction rate for the process.

EXAMPLE III

When palladium on silica-alumina catalysts are prepared using palladium concentrations in the range from 0.50–0.75% wt., it is found that there is relatively little change in catalyst activity with palladium concentration. If the rate constant K for formation of isopentane in a pentane isomerization process is plotted against palladium metal concentration in a palladium on silica-alumina catalyst containing 1–5% combined fluorine, it is found that K increases with the metal content in the range from zero to about 0.6% wt. palladium. "K" reaches a maximum at about 0.65–0.70% palladium and declines at higher palladium concentrations. The improvement in catalyst activity which is obtained by the addition of fluorine to the catalyst is substantially the same whether the fluorine is added in the form of ammonium fluoride, hydrofluoric acid, trifluoroacetic acid, ammonium fluoride, or zirconium fluoride. While it has been found that the combination of conditions of temperature and hydrogen and hydrocarbon partial pressures is somewhat unique for a particular hydrocarbon feed containing a small amount of hydrocarbon impurities with respect to the particular catalyst composition, still the range of conditions required does not vary substantially for catalysts of substantially the same activity, particularly in the region of maximum activity. Therefore, catalysts in the range from 0.50 to 0.75% wt. palladium on silica-alumina (70–90% silica), containing 1–5% fluorine, vary slightly in activity with metal content but have an optimum reaction rate and substantially zero aging rate within the shaded area of the drawing. In Table III, there are set forth the reaction rate constants and catalyst aging rates for temperatures in the range from 750° to 775° F. and different hydrogen and hydrocarbon partial pressures for catalysts of different palladium concentrations and different forms of combined fluorine. In particular, the rate constants and aging rates are set forth for catalysts consisting of 0.5%, and 0.65%, respectively, of palladium on 75/25 silica-alumina, containing fluorine added in the form of hydrofluoric acid, ammonium fluoride, trifluoroacetic acid, zirconium fluoride, or ammonium fluoride.

Table III

PALLADIUM ON 75/25 SILICA-ALUMINA WITH COMBINED FLUORINE RATE CONSTANT K AND AGING RATE (−ΔY/100 HRS.)

| Catalyst | | | Reaction Conditions | | | | |
|---|---|---|---|---|---|---|---|
| Percent Pd. | Percent F. | Form of added Fluorine | Temp., °F. | $H_2$ Press., p.s.i.a. | HC Press., p.s.i.a. | K | −ΔY/100 hr. |
| 0.65 | 2 | HF | 775 | 425 | 140 | 18.0 | 0 |
| 0.65 | 2 | $NH_4F$ | 780 | 475 | 145 | 18.0 | 1.0 |
| 0.65 | 2 | $CF_3COOH$ | 765 | 475 | 145 | 17.5 | 0 |
| 0.65 | 2 | $AlF_3$ | 775 | 425 | 145 | 18.0 | 0 |
| 0.65 | 2 | $ZnF_4$ | 760 | 425 | 150 | 17.0 | 0 |
| 0.50 | 2 | HF | 765 | 425 | 150 | 17.0 | 0 |
| 0.50 | 2 | HF | 780 | 425 | 140 | 17.5 | 0 |

In the table it should be noted that the reaction rate constants and the catalyst aging rates correspond to the values within the shaded area of the drawing where a maximum reaction rate and a substantially zero aging are obtained.

EXAMPLE IV

When palladium on silica-alumina catalysts are prepared in different sizes and in different palladium concentrations, it is found that there is a definite relationship between catalyst pellet size, palladium concentration, and resistance to aging. These catalysts increase in resistance to aging with decrease in catalyst pellet size and with increase in palladium concentration up to about 0.75% wt. Thus, catalyst pellets of ⅛" diameter are more resistant to aging than pellets of ¼" diameter, and ¹⁄₁₆" pellets (extruded and cut into short lengths, or formed by breaking ⅛" pellets in half) are even more resistant to aging. Similarly, catalysts containing more than 0.50% wt. palladium are more resistant to aging than catalysts containing lesser amounts of palladium. The differences in aging due to size and palladium concentration are most apparent under conditions of temperature and pressure which are conducive to catalyst aging, the larger pellets having lower palladium content aging more rapidly. Under conditions of temperature and pressure where aging is slight, the difference in size between ⅛" and ¹⁄₁₆" pellets and the difference in palladium concentration between 0.35% and 0.65% may be sufficient to prevent aging completely. In Table IV aging rates are set forth for catalysts of different size and palladium concentration under conditions which are conducive to moderate aging.

Table IV

Feed: 88% n-C₅H₁₂, 2% i-C₅H₁₂, 5% cy-C₅H₁₀, 5% n-C₆H₁₄
Reaction conditions:
 760° F.  8.3 LWHSV.  H₂—430 p.s.i.a.
 Hydrocarbon—185 p.s.i.a.
Catalyst support: 75/25 silica-alumina+2% HF

| Percent Pd. | Particle size, in. | Aging Rate −ΔY/100 hrs. |
|---|---|---|
| 0.35 | ⅛ pellets | 7 |
| 0.35 | ⅛ extrudate | 5 |
| 0.35 | ¹⁄₁₆ cracked pellets | 1.4 |
| 0.35 | ¹⁄₁₆ extrudate | 1.3 |
| 0.55 | ¹⁄₁₆ extrudate | 1.0 |

While I have described my invention with special emphasis upon one or more specific embodiments, I wish it to be understood that within the scope of the appended claims this invention may be practiced otherwise than as specifically described.

The embodiments of the invention in which an exclusive property or privilege is claimed are defined as follows.

I claim:

1. A process for the isomerization of a sulfur-free hydrocarbon feed comprising n-pentane, containing an appreciable amount of other C₄–C₇ hydrocarbons as impurities, but not exceeding about 10% vol., which comprises contacting said hydrocarbon feed and hydrogen with a catalyst consisting essentially of 0.50–0.75% wt. palladium on silica-alumina, containing 70–90% silica, having 1–5% combined fluorine, at a hydrogen partial pressure of 425–475 p.s.i.a., at a hydrocarbon partial pressure of about 140–155 p.s.i.a., a reaction temperature of 750–785° F., lying within the shaded area of the drawing, said process being characterized by the reaction rate constant of about 17–22, which remains substantially constant for periods of operation in excess of 100 hrs.

2. A process in accordance with claim 1 in which the principal hydrocarbon impurities are n-hexane and cyclopentane.

3. A process in accordance with claim 1 in which the hydrocarbon pressure and reaction temperature lie substantially on the line A—B in the drawing.

4. A process in accordance with claim 1 in which the catalyst support is 75/25 silica-alumina.

5. A process in accordance with claim 1 in which the catalyst support is 87/13 silica-alumina.

6. A process in accordance with claim 1 in which the catalyst contains about 2% fluorine, added as a fluorine-containing acid.

7. A process in accordance with claim 3 in which the catalyst comprises 0.65% palladium on 75/25 silica-alumina, containing 2% combined fluorine.

8. A process in accordance with claim 7 in which the principal hydrocarbon impurities are n-hexane and cyclopentane.

9. A process in accordance with claim 7 in which the reaction temperature is about 750–760° F.

10. A process in accordance with claim 8 in which the reaction temperature is about 750–760° F.

References Cited in the file of this patent

UNITED STATES PATENTS

| | | |
|---|---|---|
| 2,830,013 | Northcott et al. | Apr. 8, 1958 |
| 2,831,908 | Starnes et al. | Apr. 22, 1958 |
| 2,834,823 | Patton et al. | May 13, 1958 |
| 2,925,453 | Folkins et al. | Feb. 16, 1960 |
| 2,943,128 | Folkins et al. | June 28, 1960 |
| 2,944,096 | Teter et al. | July 5, 1960 |

UNITED STATES PATENT OFFICE
CERTIFICATE OF CORRECTION

Patent No. 3,047,646                                    July 31, 1962

Norman L. Carr

It is hereby certified that error appears in the above numbered patent requiring correction and that the said Letters Patent should read as corrected below.

Column 1, line 21, for "cyclopentate" read -- cyclopentane --; line 43, for "2,948,128" read -- 2,943,128 --; column 2, lines 21 and 38, for "againg", each occurrence, read -- aging --; column 3, line 4, for "catalystic" read -- catalytic --; column 4, line 59, for "reatcor" read -- reactor --; column 6, line 44, for "is activity occording" read -- in activity according --; line 49, for "subsantially" read -- substantially --; column 8, Table III, third column, lines 3 and 4 thereof, for "CF$^3$COOH" and "AlF$^3$", respectively, read -- $CF_3COOH$ -- and -- $AlF_3$ --, respectively.

Signed and sealed this 4th day of December 1962.

(SEAL)
Attest:

ERNEST W. SWIDER                                        DAVID L. LADD

Attesting Officer                                          Commissioner of Patents